US006574543B2

(12) United States Patent
Ikeda (10) Patent No.: US 6,574,543 B2
(45) Date of Patent: Jun. 3, 2003

(54) METHOD AND APPARATUS FOR MAINTAINING A VEHICLE SPEED AT A PREDETERMINED VEHICLE SPEED (75) Inventor: Munetoyo Ikeda, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/023,854

(22) Filed: Dec. 21, 2001

(65) Prior Publication Data

US 2002/0082764 A1 Jun. 27, 2002

(30) Foreign Application Priority Data

Dec. 26, 2000 (JP) ......................... 2000-393903

(51) Int. Cl.[7] ................................. B60T 8/24

(52) U.S. Cl. ........................ 701/95; 701/93; 180/170

(58) Field of Search .................. 701/95, 93, 51, 701/55, 61, 64; 180/170

(56) References Cited

U.S. PATENT DOCUMENTS 6,374,173 B1 * 4/2002 Ehlbeck ...................... 701/93

FOREIGN PATENT DOCUMENTS

JP          8-295155          11/1996

* cited by examiner

Primary Examiner—Yonel Beaulieu
(74) Attorney, Agent, or Firm—Foley & Lardner (57) ABSTRACT The gearshift of an automatic transmission (25) connected to an engine is controlled by a transmission controller (15) in response to the vehicle speed and the accelerator pedal depression amount. The controller (11) calculates a transmission target automatic transmission output torque so that the vehicle speed coincides with a predetermined vehicle speed (17), and calculates the output torque of the engine based on the gear ratio and the transmission target output torque (27). The controller (11) determines whether or not the transmission target output torque is in a state in which a predetermined increase is not possible (21). When the transmission target output torque is in the state in which a predetermined increase is not possible, the controller (11) limits the transmission target automatic transmission output torque (17, 17B) and controls the output torque of the engine based on the limited transmission target output torque (19A, 20, 21). The controller (11) advances the timing of downshifts executed by the automatic transmission (25) by outputting the sum of a predetermined increment and the accelerator pedal depression amount calculated from the limited transmission target output torque to the transmission controller (24, 29).

10 Claims, 6 Drawing Sheets

FIG. 8A RUNNING RESISTANCE

FIG. 8B ENGINE TORQUE SATURATION DETERMINATION

FIG. 8C SPEED

FIG. 8D TARGET TRANSMISSION OUTPUT TORQUE VALUE

FIG. 8E TARGET THROTTLE OPENING VALUE

FIG. 8F GEAR RATIO

FIG. 8G ACTUAL TRANSMISSION OUTPUT TORQUE

METHOD AND APPARATUS FOR MAINTAINING A VEHICLE SPEED AT A PREDETERMINED VEHICLE SPEED

FIELD OF THE INVENTION

This invention relates to the automatic control of the running speed of a vehicle.

BACKGROUND OF THE INVENTION

Tokkai Hei 8-295155 published by the Japanese Patent Office in 1996 discloses a fixed running speed control device for a vehicle (cruise control device). The fixed speed control device is a device which maintains a vehicle speed set by a driver. When the driver operates a switch, the vehicle speed at that time is detected by a vehicle speed sensor and is stored in an engine controller as a target vehicle speed. Thereafter, the engine controller performs feedback control on the throttle opening of the engine to make the actual vehicle speed coincide with the target vehicle speed.

For a vehicle equipped with an automatic transmission, the gear ratio is generally determined by an accelerator pedal depression and a vehicle speed. However, the gear ratio cannot be controlled by the accelerator pedal depression since the accelerator pedal depression becomes zero when using the cruise control device. Therefore, the cruise control device firstly determines a throttle opening based on the target automatic transmission output torque and the vehicle speed to achieve a target vehicle speed. Then, the gear ratio is controlled by the determined throttle opening.

SUMMARY OF THE INVENTION

This cruise control device is provided with a disturbance compensator that compensates for the disturbances such as a road gradient. When the engine torque reaches an upper limit before reaching the target output torque for the automatic transmission, the vehicle cannot realize the target vehicle speed. When this situation continues, a disturbance estimation value is increased and the target output torque of the engine also increases as a result. The throttle opening increases as the target output torque of the engine increases, and the automatic transmission performs a downshift when the throttle opening reaches a specific value. This type of downshift causes a sharp increase in the automatic transmission output torque and as a result causes a torque shock.

Suppressing the increase in the target engine torque may prevent such a downshift, but the target vehicle speed will not be achieved if the increase in the target engine torque is suppressed.

It is therefore an object of this invention to provide a cruise control device which advances a downshift performed by the automatic transmission when engine output torque reaches an upper limit.

In order to achieve the above objects, this invention provides a cruise control device used in a vehicle to maintain a vehicle speed at a predetermined vehicle speed, the vehicle being provided with an automatic transmission connected to an engine, and a transmission controller performing gear shift of the automatic transmission in response to a target throttle opening and a vehicle speed.

The cruise control device comprises a sensor which detects a vehicle speed, a sensor which detects a gear ratio of the automatic transmission, and a programmable controller.

The programmable controller is programmed to calculate a target transmission output torque of the automatic transmission which causes the vehicle speed to coincide with the fixed speed; calculate an output torque of the engine by using the target transmission output torque and the gear ratio; determine whether or not a transmission output torque is under a predetermined condition wherein the transmission output torque is impossible to increase; limit the target transmission automatic transmission output torque if the transmission output torque is under the predetermined condition; control the output torque of the engine based on a limited target transmission output torque; calculate the target throttle opening based on the limited target transmission output torque; and output the sum of the target throttle opening value and a predetermined correction value as a throttle opening command value to the transmission controller.

The details as well as other features and advantages of this invention are set forth in the remainder of the specification and are shown in the accompanying drawings.

DESCRIPTION OF THE PREFERRED EMBODIMENTS

Figure 1:
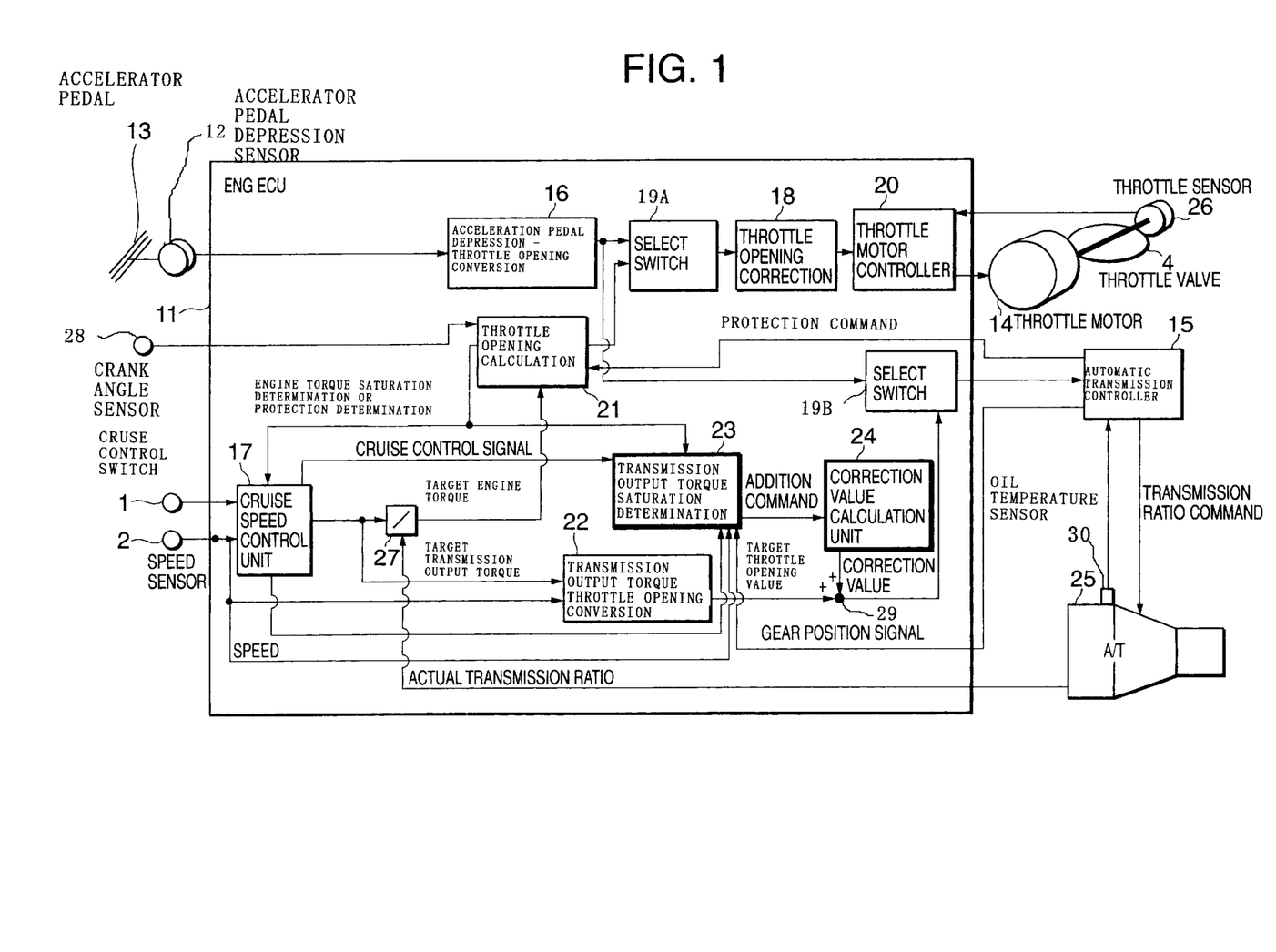
FIG. 1 is a schematic diagram of a cruise control device according to this invention.

Referring to FIG. 1, a vehicle is provided with a throttle valve 4 which controls the amount of intake air, an automatic transmission 25, a transmission controller 15 which controls the gear ratio of the automatic transmission 25, an accelerator pedal 13, and a cruise control switch 1.

The cruise control device according to this invention controls the opening of the throttle valve 4 by outputting a signal to a throttle motor 14. The gear ratio of the automatic transmission 25 is also controlled by outputting a control signal to the transmission controller 15.

The cruise control device comprises an engine controller 11 to execute this control. The engine controller 11 comprises one or a plurality of microcomputers provided with a central processing unit (CPU), a read only memory (ROM), a random access memory (RAM) and an input/output interface (I/O interface).

The cruise control device also comprises an acceleration pedal depression sensor 12 which detects an accelerator pedal depression of the accelerator pedal 13, a throttle opening sensor 26 which detects an opening of the throttle valve 4, a vehicle speed sensor which detects a vehicle speed Vsp, and a crank angle sensor 28 which detects an engine rotation speed Ne. The data detected by these sensors are transmitted to the engine controller 11. Signals showing whether the cruise control switch 1 is in ON or OFF position and signals showing the actual gear ratio of the automatic transmission 25 are also transmitted to the engine controller 11.

The engine controller 11 comprises an accelerator pedal depression-throttle opening conversion unit 16, a cruise speed control unit 17, a throttle opening correction unit 18, a first select switch 19A, a second select switch 19B, a throttle motor control unit 20, a throttle opening calculation unit 21, a target automatic transmission output torque-throttle opening conversion unit 22, an automatic transmission output torque saturation determination unit 23, a correction value calculation unit 24 and a divider 27.

Each of the above units is a virtual unit for describing the functions of the engine controller 11 and does not have a physical existence.

The accelerator pedal depression-throttle opening conversion unit 16 calculates a target throttle opening based on input signals from the accelerator pedal depression sensor 12 and outputs the calculation result to the select switches 19A and 19B.

The first select switch 19A determines whether or not the vehicle is performing cruise control based on the signal from the throttle opening calculation unit 21. When the vehicle is not performing cruise control, a target throttle opening signal corresponding to the accelerator pedal depression from the accelerator pedal depression-throttle opening conversion unit 16 is selected and is transmitted to the throttle opening correction unit 18. During cruise control, the throttle opening command from a throttle opening calculation unit 21 described hereafter is transmitted to the throttle opening correction unit 18.

The throttle opening correction unit 18 corrects the value of the target throttle opening based on the operating conditions of the engine and transmits the corrected value to the throttle motor control unit 20. The correction based on engine operating conditions is for example a correction during lean burn conditions. The throttle motor control unit 20 sets the corrected value to a target throttle opening and transmits the target throttle opening to the throttle motor 14. The throttle opening is feedback controlled to make the actual throttle opening detected by the throttle sensor 26 coincide with the target throttle opening.

The second select switch 19B determines whether or not cruise control is in operation based on the signal from the target automatic transmission output torque-throttle opening conversion unit 22. When the cruise control is not performed, the target throttle opening from the accelerator pedal depression-throttle opening conversion unit 16 is selected and is transmitted to the transmission controller 15 as a parameter for gear ratio determination. During cruise control, a target throttle opening from an adder 29 is selected and is transmitted to the transmission controller 15 as a parameter for gear ratio determination. The adder 29 will be described later.

Figure 3:
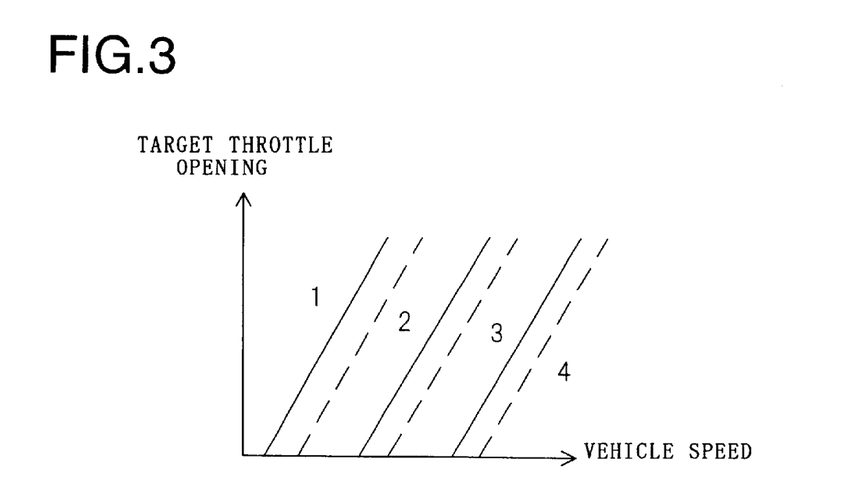
FIG. 3 is a diagram showing a speed change map stored in a transmission controller according to this invention.

The transmission controller 15 determines the gear ratio for the automatic transmission 25 by looking up a map shown in FIG. 3 based on the target throttle opening and the vehicle speed Vsp detected by vehicle speed sensor 2. After the determination, a corresponding gear ratio signal is transmitted to the automatic transmission 25. Furthermore, a gear position signal is transmitted to the automatic transmission output torque saturation determination unit 23.

Figure 5:
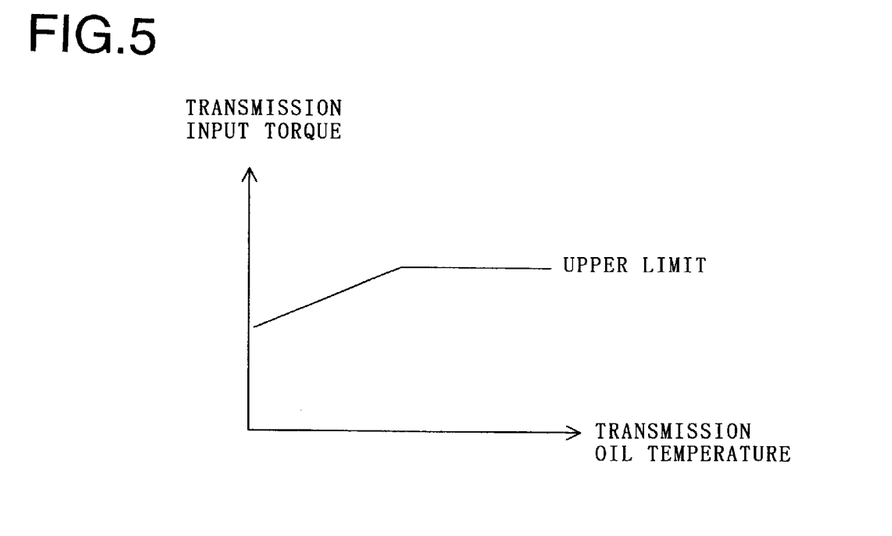
FIG. 5 is a diagram showing a map of transmission upper limiting values for input torque stored in a transmission controller.

The transmission controller 15 outputs a protection command signal to the throttle opening calculation unit 21 if the oil temperature of the transmission is below a predetermined value. The oil temperature is detected by the oil temperature sensor 30 mounted in the automatic transmission 25. This is in order to prevent input of high levels of torque at low oil temperatures. The input torque of the automatic transmission 25 is limited according to the oil temperature as shown in FIG. 5.

Based on a signal from the cruise control switch 1, the cruise control calculation unit 17 outputs a cruise control determination signal showing whether or not cruise control is performed to the automatic transmission output torque saturation determination unit 23. When the cruise control switch 1 turns from OFF to ON, the vehicle speed is set as a target vehicle speed Vspr. Thereafter, a target transmission output torque is determined, so the vehicle speed Vsp input from the vehicle speed sensor 2 coincides with the target vehicle speed Vspr.

A divider 27 divides the target transmission output torque by the gear ratio of the automatic transmission 25, converts this value into an target engine output torque, and sends it out to the throttle opening control unit 21.

Figure 4:
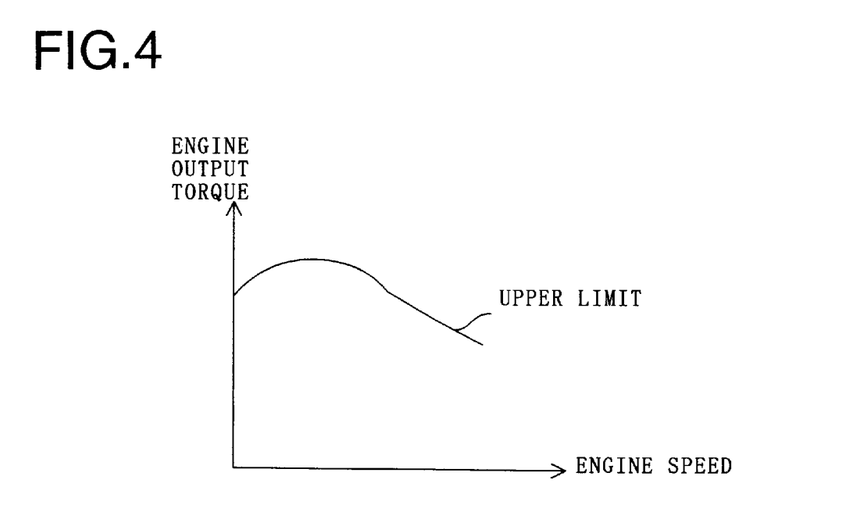
FIG. 4 is a diagram showing a map of upper limiting values for engine torque stored in an engine controller.

The throttle opening calculation unit 21 calculates a target throttle opening value for the throttle valve 4 based on the target engine output torque from the divider 27 and outputs the result to the first opening selection unit 19A. The throttle opening calculation unit 21 calculates an upper limit value for engine output torque based on the engine rotation speed Ne detected by the crank angle sensor 28 by looking up a map shown in FIG. 4. When the target engine output torque from the divider 27 exceeds an upper limit value, it is determined that engine output torque is saturated and a saturation signal is transmitted to the cruise control calculation unit 17. Furthermore, a protection command signal from the transmission controller 15 is transmitted to the cruise control calculation unit 17.

Figure 7:
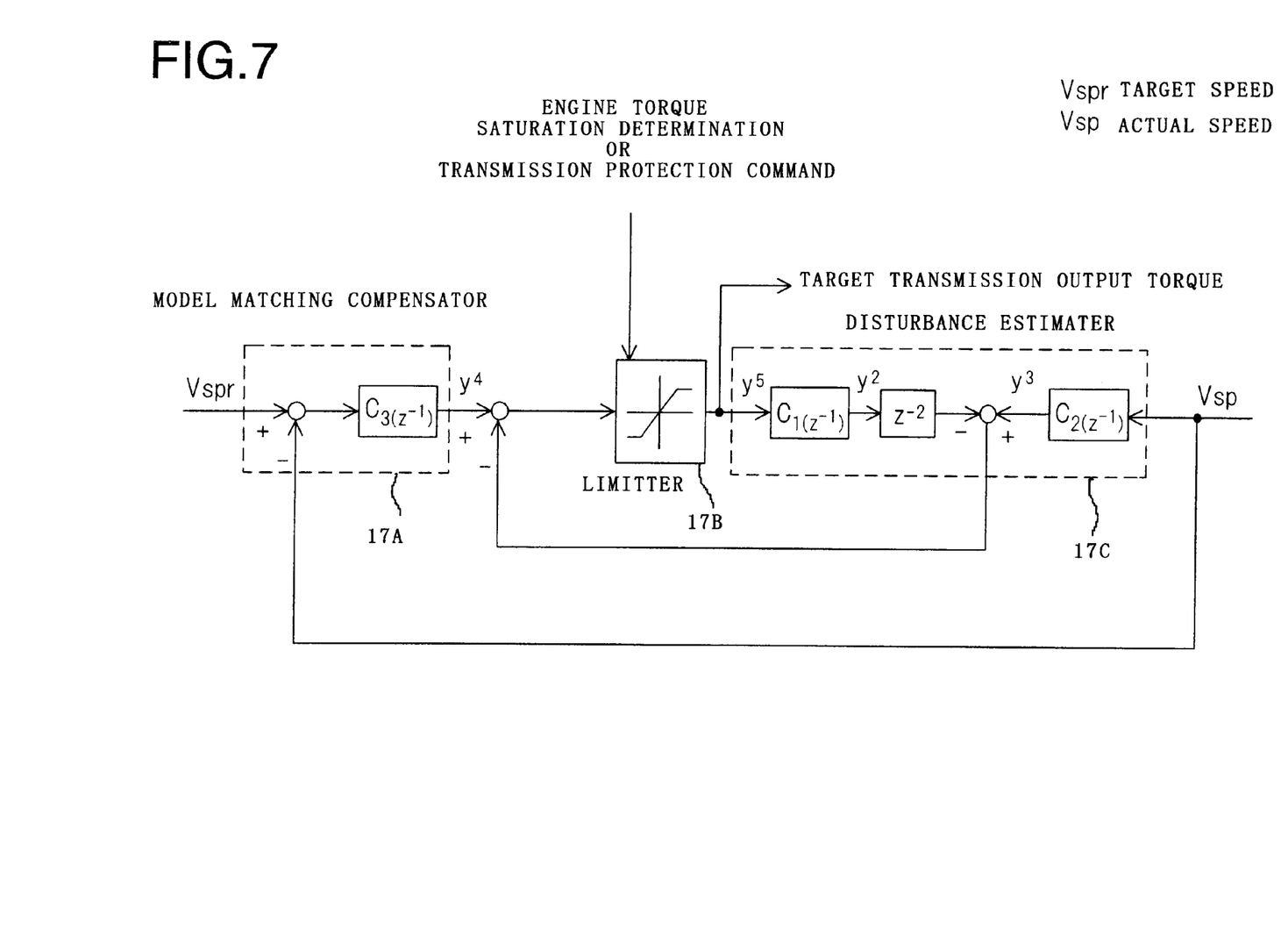
FIG. 7 is a block diagram showing a feedback control routine for engine output torque executed by the engine controller.

When the engine torque saturation signal or the protection command signal is received, the cruise control calculation unit 17 applies a process executed by a limiter 17B as shown in FIG. 7 to the target transmission output torque. The resulting value is sent to the divider 27 and the target automatic transmission output torque-throttle opening conversion unit 22.

In this manner, a feedback loop is formed by the cruise control calculation unit 17 and the throttle opening control unit 21. The feedback control routine is shown in FIG. 7.

Referring to FIG. 7, the cruise control calculation unit 17 comprises a model matching compensator 17A, a limiter 17B and a disturbance estimator 17C. These devices are also virtual devices for describing the functions of the engine controller 11 and do not have a physical existence.

The cruise control calculation unit 17 calculates a target transmission output torque, so the actual vehicle speed Vsp coincides with a target vehicle speed Vspr. These devices perform the calculation by considering the behavior of the vehicle power train through using a "model matching method" and a "proximate zeroing method" which are known methods of linear control. The symbol z in the figure denotes a delay calculation element performing a delay process. The symbol $z^{-1}$ denotes this value on an immediately previous cycle. $C_1(z^{-1})$ and $C_2(z^{-1})$ denote the near zeroing process, and $C_3(z^{-1})$ denotes the model matching processing. Detailed description of the control routine and function of the model matching compensator 17A and the disturbance estimator 17C is omitted since it is a known art disclosed in U.S. Pat. No. 5,758,306. This process limits the target transmission output torque obtained from the output of the model matching compensator 17A and the disturbance estimator 17C to an upper limit value by looking up a map shown in FIG. 4 based on the protection command signal or the engine torque saturation signal from the throttle opening calculation unit 21. The limited value is output to the divider 27 and the target automatic transmission output torque-throttle opening conversion unit 22.

The target transmission output torque transmitted to the target automatic transmission output torque-throttle opening conversion unit 22 and the divider 27 is the value after processing by the limiter 17B. Thus, the target throttle opening value from the throttle opening calculation unit 21 to the select switch 19A corresponds to the value calculated based on the target transmission output torque after processing.

Figure 2:
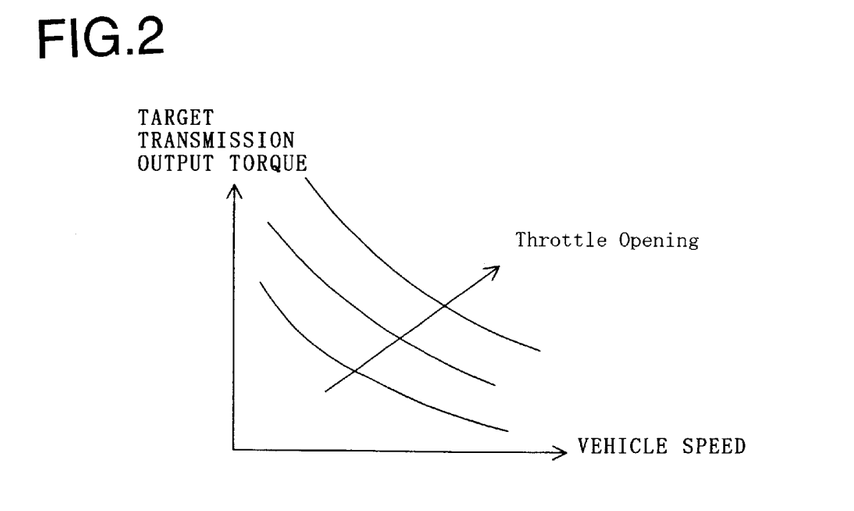
FIG. 2 is a diagram showing a map of a throttle opening stored in an engine controller according to this invention.

The target automatic transmission output torque-throttle opening conversion unit 22 converts the target transmission output torque into the throttle opening by looking up a map shown in FIG. 2 using the values of the target transmission output torque and the vehicle speed Vsp. Also, the target automatic transmission output torque-throttle opening conversion unit 22 sends the converted target throttle opening to adder 29.

The throttle opening calculation unit 21 also transmits the saturation signal and the protection command signal to the automatic transmission output torque saturation determination unit 23. The automatic transmission output torque saturation determination unit 23 performs the process below when the cruise control signal from the cruise speed control unit 17 is ON.

That is to say, whether or not the automatic transmission output torque has reached an upper limit is determined based on the engine torque saturation signal, the protection command signal, the gear position of the automatic transmission, the vehicle speed Vsp, and the target vehicle speed Vspr. More precisely, if any of the following conditions is satisfied, it is determined that automatic transmission output torque 25 is saturated. The conditions are; the saturation signal is ON, the maintenance command signal is ON, or the difference between the target vehicle speed Vspr and the vehicle speed Vsp detected by the vehicle speed sensor 2 become greater than or equal to 1.6 km/hr and it has continued for greater than or equal to 1000 milliseconds.

The result of this determination is transmitted to the additional opening calculation unit 24. If the output torque of automatic transmission is saturated, the correction value calculation unit 24 calculates a correction value to correct the target throttle opening calculated by the target automatic transmission output torque-throttle opening conversion unit 22. The adder 29 calculates a corrected target throttle opening by adding a correction value to the target throttle opening and transmits the result to the second select switch 19B.

Figure 6:
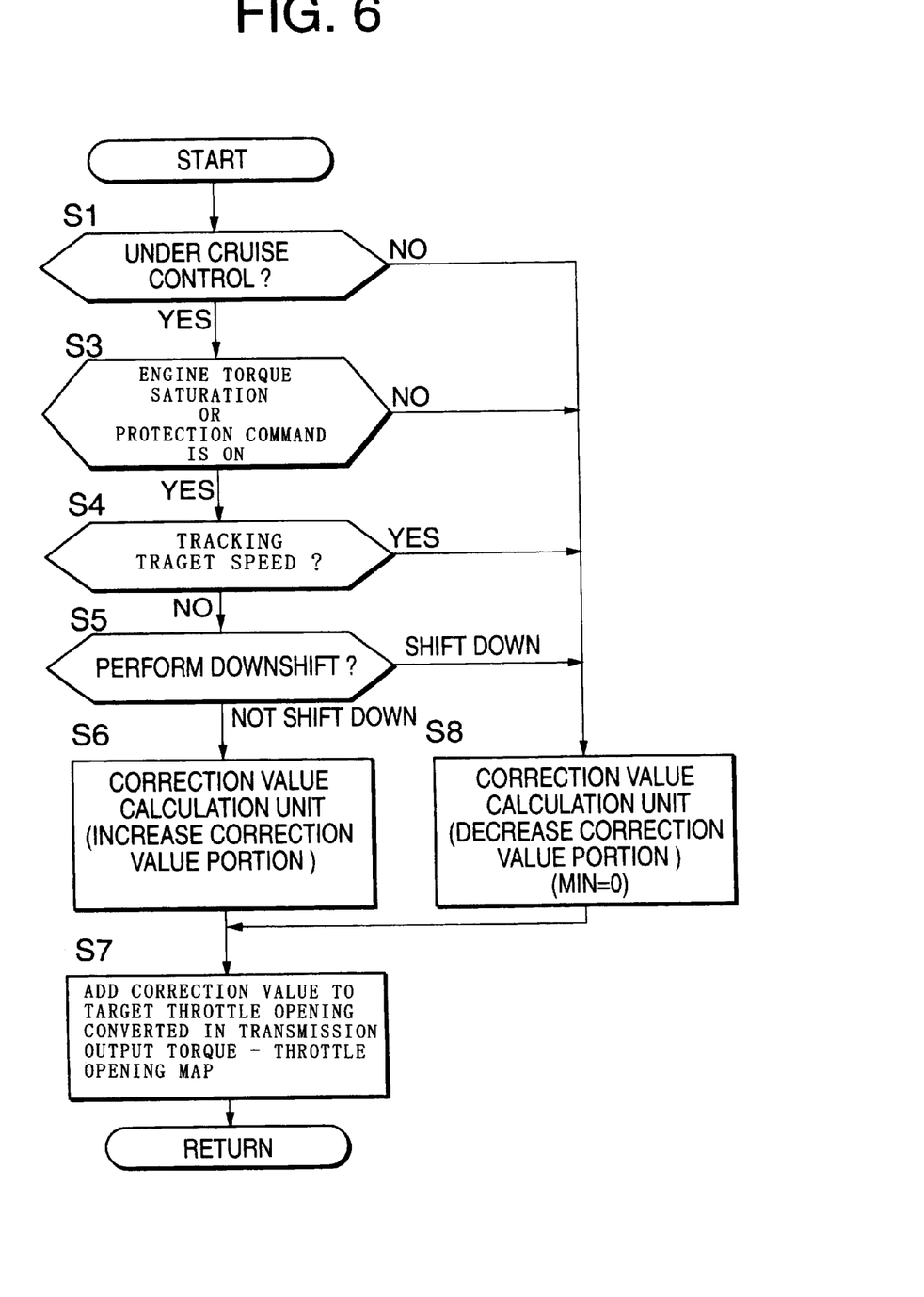
FIG. 6 is a flowchart describing a routine for correcting the throttle opening executed by an engine controller.

The above process executed by the adder 29, the correction value calculation unit 24, and the automatic transmission output torque saturation determination unit 23 is executed as a correction routine on the target throttle opening as shown in FIG. 6. This routine is executed by the engine controller 11 during engine operation at intervals of 10 milliseconds.

Referring to FIG. 6, firstly in a step S1, it is determined whether or not the vehicle is performing cruise control. During cruise control, the routine proceeds to a step S3. When cruise control is not performed, the routine proceeds to a step S8.

In the step S3, it is determined whether or not the engine torque saturation signal or the protection command signal is ON. When at least one of the signals is ON, the routine proceeds to a step S4. When both signals are OFF, the routine proceeds to the step S8.

In a step S4, it is determined whether the actual vehicle speed Vsp coincides with the target vehicle speed Vspr. If the difference between the target vehicle speed Vspr and the actual vehicle speed Vsp becomes greater than or equal to 1.6 km/hr and this condition continues for greater than or equal to 1000 milliseconds, it is determined that the actual vehicle speed Vsp does not coincide with the target vehicle speed Vspr. When the actual vehicle speed Vsp does not coincide with the target vehicle speed Vspr, the routine proceeds to a step S5. When this is not the case, the routine proceeds to the step S8.

In the step S5, it is determined whether or not the automatic transmission 25 is performing a downshift. When the automatic transmission 25 is not performing a downshift, the routine proceeds to a step S6. When the automatic transmission 25 is performing a downshift, the routine proceeds to the step S8.

When the automatic transmission output torque 25 is saturated, the routine proceeds to the step S6 and when it is not saturated, the routine proceeds to the step S8.

In the step S6, the correction value portion corresponding to the difference between the target vehicle speed Vspr and the actual vehicle speed Vsp is added to the correction value calculated in the previous iteration.

In the step S8, the correction value is decreased in a stepwise manner from a positive value such that it finally becomes zero. The correction value does not immediately reach zero when the process in the step S8 is executed on a given cycle of the routine. On each cycle of the control routine in which the correction is computed, the value decreases by a fixed amount from the predetermined value. However the minimum correction value is zero and it does not become negative values.

After calculating the correction in the steps S6 or S8, the correction value is added to the target throttle opening transmitted by the target automatic transmission output torque-throttle opening conversion unit 22 in the step S7 and thereafter the routine is repeated.

The steps S1 to S5 are processed in the automatic transmission output torque saturation determination unit 23. The steps S6 and S8 are processed in the correction value calculation unit 24. The step S7 is processed in the adder 29.

The corrected target throttle opening calculated by the routine above is only used in controlling the automatic transmission 25 with the transmission controller 15.

The target throttle opening used in controlling the throttle 4 is the value processed by the limiter 17B based on the target transmission output torque.

As shown in FIG. 3, the transmission controller 15 controls the automatic transmission 25 so that a lower gear is used as the throttle opening command increases. Thus, adding a correction value to the target throttle opening advances the downshift. Furthermore, the automatic transmission output torque 25 increases as the lower gear is used. Thus, when the automatic transmission output torque 25 is saturated, it is possible to prevent shortfalls in output torque by executing an early downshift.

In this manner, during cruise control, when the engine output is saturated, the target engine output torque is suppressed and the transmission controller 15 advances the downshift timing by increasing the target throttle opening used to control the automatic transmission 25. As a result, if the increases in the automatic transmission output torque 25 are advanced, the saturation of the target engine output torque can be prevented and the correspondence of the actual vehicle speed Vsp with the target vehicle speed Vspr can be improved. Furthermore, it is possible to enhance suppression of torque shock by advancing downshift timing.

Finally, the transient behavior of the vehicle with this cruise control device is shown in FIGS. 8A–8G.

Figure 8A:
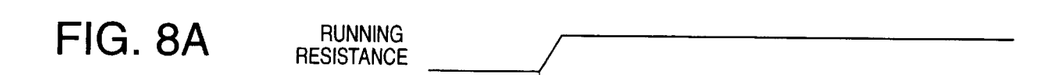
FIGS. 8A–8G are timing charts showing an example of control performed by the cruise control device according to this invention.
Figure 8B:
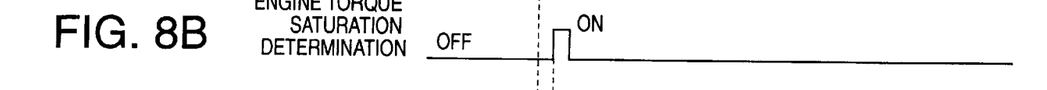

During cruise control, when running resistance increases as shown in FIG. 8A, firstly the target output torque of the engine is increased in order to increase the engine output torque. When a limit is not provided on the target transmission output torque, the target transmission output torque continues to increase along the broken line as shown in FIG. 8D even after the engine output torque reaches an upper limit. Consequently, the automatic transmission 25 performs a downshift as shown by the broken line in FIG. 8F when the opening of the throttle 4 has increased. When the downshift is performed with a large throttle opening, the automatic transmission output torque 25 undergoes rapid increase as shown by the broken line in FIG. 8G and a torque shock results. Furthermore, this rapidly increasing automatic transmission output torque 25 will exceed the target output torque.

Figure 8C:
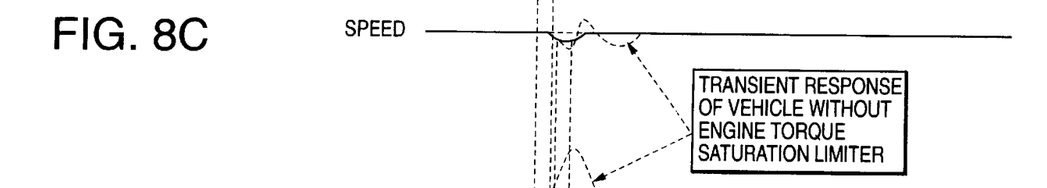
Figure 8D:
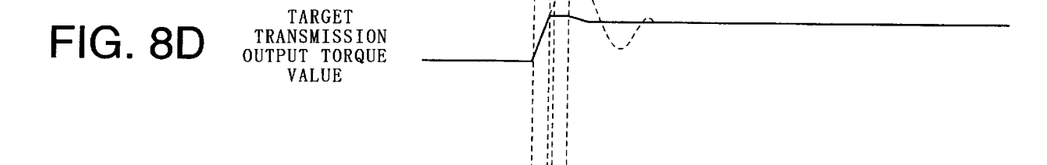

As a consequence however, since the transmission target output torque rapidly decreases, the vehicle speed fluctuates as shown in FIG. 8C.

Figure 8E:
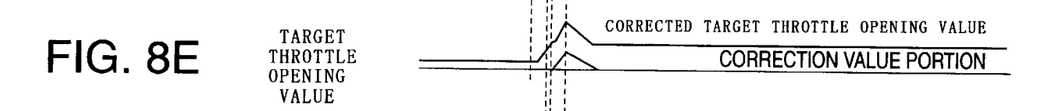
Figure 8F:
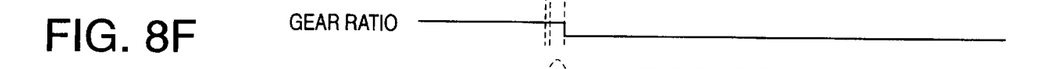

With this cruise control device, the limiting process is applied to the target transmission output torque as shown in FIG. 8B when it is determined that the engine output torque has become saturated. On the other hand, as shown in FIG. 8E, the target throttle opening used to control the automatic transmission 25 is adjusted by the correction value. As a result, a downshift is performed before the throttle opening becomes excessively large.

Figure 8G:
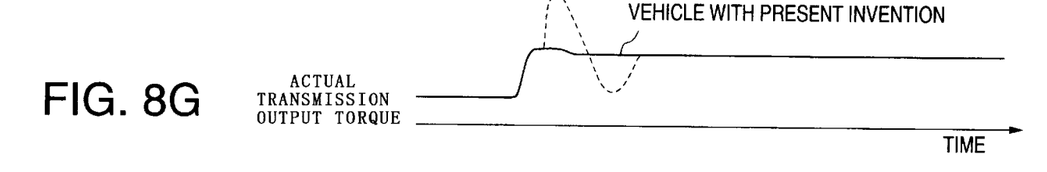

Thus, the automatic transmission output torque 25 does not become excessive and the automatic transmission output torque 25 is quickly suppressed to the target output torque.

The entire contents of Japanese Patent Applications P2000-393903 (filed on Dec. 26, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A cruise control device used in a vehicle to maintain a vehicle speed at a predetermined vehicle speed, the vehicle being provided with an automatic transmission connected to an engine, and a transmission controller performing gear shift of the automatic transmission in response to a target throttle opening and a vehicle speed, the cruise control device comprising:

a sensor which detects the vehicle speed;
a sensor which detects a gear ratio of the automatic transmission; and
a programmable controller programmed to:
    calculate a target transmission output torque of the automatic transmission which causes the vehicle speed to coincide with the predetermined vehicle speed;
    calculate a target engine output torque by using the target transmission output torque and the gear ratio;
    determine whether the target engine output torque is under a predetermined condition wherein a present engine output torque is saturated;
    limit the target transmission output torque if the engine is under the predetermined condition;
    control the output torque of the engine based on a limited target transmission output torque;
    calculate the target throttle opening based on the limited target transmission output torque; and
    output the sum of the target throttle opening value and a predetermined correction value as a throttle opening command value to the transmission controller.

2. The cruise control device as defined in claim 1, wherein the controller is further programmed to determine that the transmission output torque cannot be increased when the target engine output torque exceeds a predetermined upper limit value which is determined according to the engine rotational speed.

3. The cruise control device as defined in claim 1, wherein the device further comprises a sensor which detects a condition of the automatic transmission, and the controller is further programmed to determine that the transmission output torque cannot be increased when the target engine output torque exceeds a predetermined upper limit value which is determined according to the condition of the automatic transmission.

4. The cruise control device as defined in claim 1, wherein the device further comprises a sensor which detects the oil temperature of the automatic transmission, and the controller is further programmed to determine that the transmission output torque cannot be increased when the target engine output torque exceeds a predetermined upper limit value which is determined according to the oil temperature of the automatic transmission.

5. The cruise control device as defined in claim 1, wherein the controller is further programmed to determine that the transmission output torque cannot be increased when a difference between the predetermined vehicle speed and the actual vehicle speed exceeds a predetermined value for a predetermined time period.

6. The cruise control device as defined in claim 2, wherein the controller is further programmed to determine that the engine output torque cannot be increased when the target engine output torque exceeds the predetermined upper limit value and a difference between the predetermined vehicle speed and the actual vehicle speed exceeds a predetermined value for a predetermined period.

7. The cruise control device as defined in claim 3, wherein the controller is further programmed to determine that the transmission output torque cannot be increased when the target engine output torque exceeds the predetermined upper limit value and a difference between the predetermined vehicle speed and the actual vehicle speed exceeds a predetermined value for a predetermined period.

8. The cruise control device as defined in claim 1, wherein the controller is further programmed to gradually reduce the correction value to zero after the transmission output torque comes out of the predetermined condition.

9. A cruise control method used in a vehicle to maintain a vehicle speed at a predetermined vehicle speed, the vehicle being provided with an automatic transmission connected to an engine, a sensor which detects a vehicle speed, a sensor which detects a gear ratio of the automatic transmission, and a transmission controller performing gear shift of the automatic transmission in response to a target throttle opening and a vehicle speed, the cruise control method comprising:

calculating a target transmission output torque of the automatic transmission which causes the vehicle speed to coincide with the predetermined vehicle speed;

calculating a target engine output torque by using the target transmission output torque and the gear ratio;

determining whether a target engine output torque is under a predetermined condition wherein a present engine output torque is saturated;

limiting the target transmission output torque if the engine is under the predetermined condition;

controlling the output torque of the engine based on a limited target transmission output torque;

calculating the target throttle opening based on the limited target transmission output torque; and outputting the sum of the target throttle opening value and a predetermined correction value as a throttle opening command value to the transmission controller.

10. A cruise control device used in a vehicle to maintain a vehicle speed at a predetermined vehicle speed, the vehicle being provided with an automatic transmission connected to an engine, and a transmission controller performing gear shift of the automatic transmission in response to a target throttle opening and a vehicle speed, the cruise control device comprising:

means for detecting the vehicle speed;

means for detecting a gear ratio of the automatic transmission;

means for calculating a target transmission output torque of the automatic transmission which causes the vehicle speed to coincide with the predetermined vehicle speed;

means for calculating a target engine output torque by using the target transmission output torque and the gear ratio;

means for determining whether the target engine output torque is under a predetermined condition wherein a present engine output torque is saturated;

means for limiting the target transmission output torque if the engine is under the predetermined condition;

means for controlling the output torque of the engine based on a limited target transmission output torque;

means for calculating the target throttle opening based on the limited target transmission output torque; and means for outputting the sum of the target throttle opening value and a predetermined correction value as a throttle opening command value to the transmission controller.

* * * * *